United States Patent
Dayt

(10) Patent No.: US 9,409,444 B2
(45) Date of Patent: Aug. 9, 2016

(54) CASTOR FOR FURNITURE OR THE LIKE, WITH LOCKING MEANS

(71) Applicant: TENTE ROULETTES POLYMERES—BRUANDET, La Barre (FR)

(72) Inventor: Patrick Dayt, Besancon (FR)

(73) Assignee: TENTE ROULETTES POLYMERES—BRUANDET, La Barre (FR)

( * ) Notice: Subject to any disclaimer, the term of this patent is extended or adjusted under 35 U.S.C. 154(b) by 0 days.

(21) Appl. No.: 14/781,485

(22) PCT Filed: Mar. 24, 2014

(86) PCT No.: PCT/FR2014/000059
§ 371 (c)(1),
(2) Date: Sep. 30, 2015

(87) PCT Pub. No.: WO2014/162066
PCT Pub. Date: Oct. 9, 2014

(65) Prior Publication Data
US 2016/0052339 A1 Feb. 25, 2016

(30) Foreign Application Priority Data

Apr. 2, 2013 (FR) ...................................... 13 00742

(51) Int. Cl.
*B60B 33/00* (2006.01)

(52) U.S. Cl.
CPC ......... *B60B 33/0086* (2013.01); *B60B 33/0021* (2013.01); *B60B 33/0042* (2013.01);
(Continued)

(58) Field of Classification Search
CPC ... Y10T 16/18; Y10T 16/184; Y10T 16/1853; Y10T 16/195; A45C 5/145; B60B 33/0002; B60B 33/0042; B60B 33/0078; B60B 33/021; B60B 33/0086; B60B 33/0021; B60B 33/0049; B60B 33/0057; B60B 33/0068; B60B 33/0073; B60B 33/0092; B60B 33/0094; B60B 2200/20; B60B 2200/43; B60B 2200/45; B60B 2900/112; B60B 2900/115; B60B 2900/3314; B60B 2200/224
USPC .................... 16/18 R, 35 R, 45, 47; 188/1.12
See application file for complete search history.

(56) References Cited

U.S. PATENT DOCUMENTS

| 4,333,207 A * | 6/1982 | Atwood | B60B 33/0042 16/35 R |
| 4,550,808 A * | 11/1985 | Folson | B60B 33/0042 16/35 R |

(Continued)

FOREIGN PATENT DOCUMENTS

| DE | 10 318 308 A1 | 10/2004 |
| EP | 2 556 768 A2 | 2/2013 |

(Continued)

OTHER PUBLICATIONS

International Search Report, dated Jul. 16, 2014, from corresponding PCT application.

*Primary Examiner* — William Miller
(74) *Attorney, Agent, or Firm* — Young & Thompson

(57) ABSTRACT

A lockable castor for furniture or the like includes a casing, two wheels mounted on a rotary shaft of first axis, a pivot of second axis orthogonal to the first axis, female notches in at least one of the two faces of the wheels, a lever, a male lug on the lever and complementary to the female notches, the lever being suitable for occupying two positions, a first position in which the male lug does not co-operate with any of the female notches, and a second position in which the male lug is positioned in one of the female notches, a pull connection connected to the lever, a cavity in the casing and including an opening, such that the shaft passes therethrough, the lever being constituted by a slide suitable for sliding in translation in the cavity between its two positions in a direction perpendicular to the first axis.

10 Claims, 1 Drawing Sheet

(52) U.S. Cl.
CPC ......... *B60B33/0049* (2013.01); *B60B 33/0057* (2013.01); *B60B 33/0068* (2013.01); *B60B 33/0073* (2013.01); *B60B 33/0092* (2013.01); *B60B 33/0094* (2013.01); *B60B 2200/20* (2013.01); *B60B 2200/224* (2013.01); *B60B 2200/43* (2013.01); *B60B 2200/45* (2013.01); *B60B 2900/112* (2013.01); *B60B 2900/115* (2013.01); *B60B 2900/3314* (2013.01); *Y10T 16/195* (2015.01)

(56) References Cited

U.S. PATENT DOCUMENTS

| | | | | |
|---|---|---|---|---|
| 4,941,552 A | * | 7/1990 | Screen | B60B 33/0042 16/35 R |
| 5,368,133 A | * | 11/1994 | Yang | B60B 33/0042 16/35 R |
| 5,632,360 A | * | 5/1997 | Melara | B60B 33/0042 16/35 R |
| 6,662,404 B1 | * | 12/2003 | Stroh | B60B 33/0002 16/35 R |
| 2008/0301904 A1 | * | 12/2008 | Dayt | B60B 33/0021 16/45 |
| 2009/0113671 A1 | * | 5/2009 | Chu | B60B 33/0002 16/35 R |

FOREIGN PATENT DOCUMENTS

| | | | |
|---|---|---|---|
| FR | 2 895 702 A1 | | 7/2007 |
| JP | 2010184567 A | * | 8/2010 |
| WO | 2012/035213 A1 | | 3/2012 |
| WO | WO 2012035213 A1 | * | 3/2012 ......... B60B 33/0042 |

\* cited by examiner

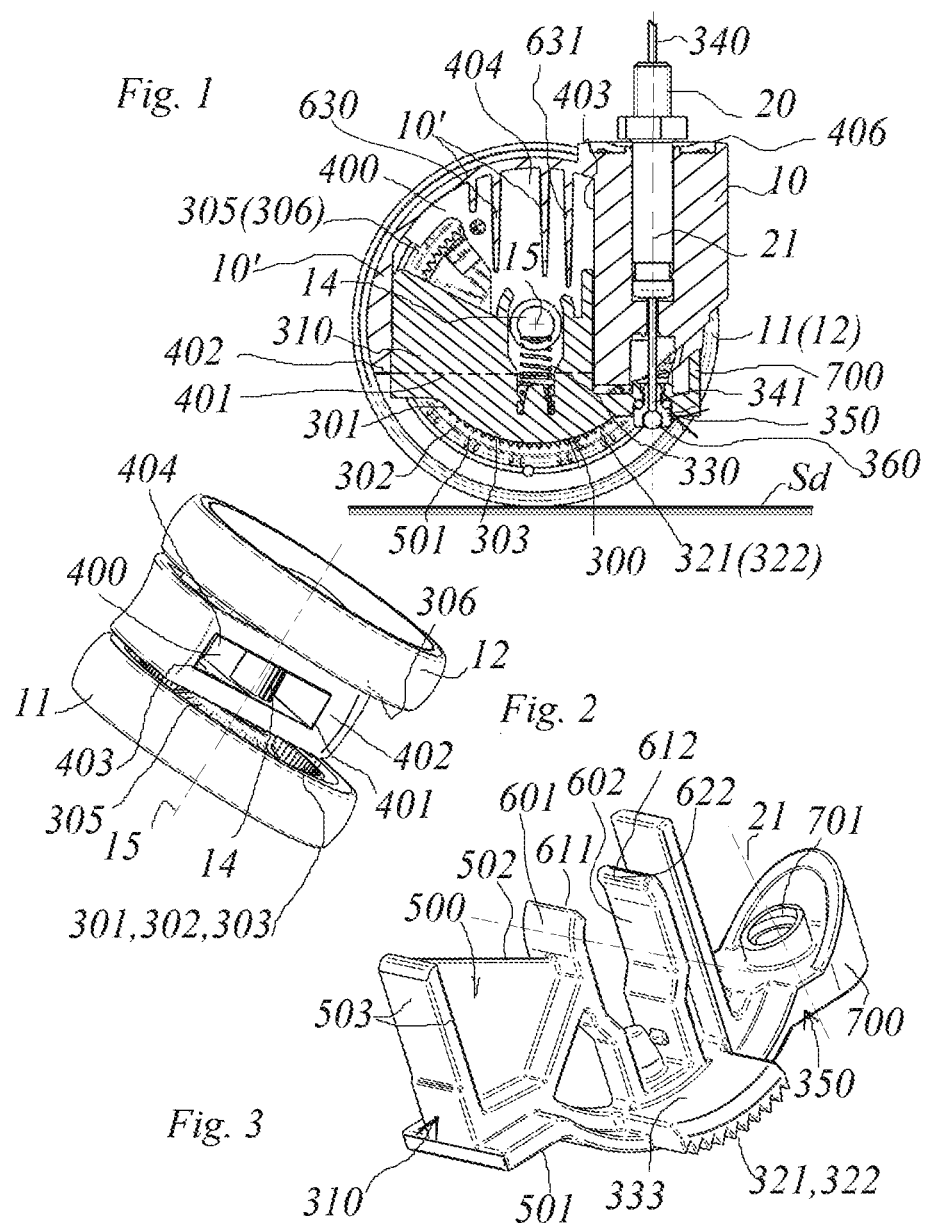

CASTOR FOR FURNITURE OR THE LIKE, WITH LOCKING MEANS

BACKGROUND OF THE INVENTION

1. Field of the Invention

The present invention relates to castors for associating with any object of the furniture type in order to make it easier to move, the castor essentially comprising two wheels, a casing for supporting and possibly protecting the wheels, and a pivot that provides the connection between the casing and a piece of furniture.

2. Description of the Related Art

In particular but non-exclusive manner, numerous such castors find an especially advantageous application in making it easier to move hospital equipment and furniture, e.g. trolleys, wheelchairs, carts, walking frames, etc., and also suitcases and the like.

The structure of such a castor must therefore be designed so that it makes it easy to move such a piece of furniture in any direction. In particular, for this purpose, it generally has two parallel-mounted wheels, means for enabling the two wheels to rotate about a horizontal axis relative to the casing in order to run on the ground for the purpose of enabling the piece of furniture to move in translation in a straight line, and means for enabling the casing to pivot relative to the piece of furniture about an axis that is substantially vertical in order to enable the castor to occupy any direction relative to the piece of furniture and thus enable the piece of furniture to be steered easily around curves.

Nevertheless, for example at the end of its movement when the piece of furniture has reached its final position, it is generally necessary to prevent the furniture from moving, if only accidentally. It is therefore preferable for the castors that are mounted on the piece of furniture then to become locked automatically, at least in terms of rotation, so as to prevent them from running on the ground, with this applying more particularly for trolleys, walking frames, suitcases, etc., and for the castors to be unlocked as a result of the user performing a voluntary action.

By way of example, such a castor is described in EP 2 556 768, FR 2 895 702 and DE 103 18 308, and more particularly in WO2012/035213.

In addition to the means defined below, the castor includes locking-and-unlocking means for locking and unlocking the two wheels relative to the casing. These locking-and-unlocking means comprise at least one set of female notches made in at least one of the two faces of the wheels that face towards the casing, a lever mounted to co-operate with the casing, at least one male lug complementary to the female notches, means for securing the male lug to the lever, the lever being mounted to pivot on the casing in such a manner as to be suitable for occupying at least two positions, a first position in which the male lug does not co-operate with any of the female notches, and a second position in which the male lug is positioned in one of the female notches, a pull connection, and means for connecting a first end of the pull connection to the lever in order to cause the lever to pass from its first position to its second position.

BRIEF SUMMARY OF THE INVENTION

That castor operates in highly satisfactory manner, however an object of the present invention is to make a castor of structure that, in comparison with the structure of the above-described castor, has a smaller number of component parts, and to enable the castor to be manufactured in more industrial manner by being easier to assemble, thereby giving it a lower cost price.

More precisely, the present invention provides a lockable castor comprising:

a casing;

at least two wheels suitable for coming into contact with a given surface;

means for mounting said two wheels to rotate relative to the casing on a shaft defined along a first axis that is substantially parallel to said surface, in such a manner that at least a portion of said casing is situated between said two wheels;

a pivot defined along a second axis, said pivot being mounted to co-operate with said casing in such a manner that said second axis is both substantially orthogonal to the first axis, being contained in a first plane parallel to the two planes respectively occupied by the two wheels, and is also situated between these two planes, said pivot emerging from the casing via a first face of said casing; and locking-and-unlocking means for locking and unlocking the two wheels relative to the casing, said locking-and-unlocking means comprising:

at least one set of female notches made in at least one of the two faces of said wheels that face towards said portion of the casing;

a lever mounted to co-operate with said casing;

at least one male lug complementary to the female notches of said set of female notches;

means for securing said male lug to said lever;

said lever also being mounted to co-operate with said casing in such a manner as to be suitable for occupying at least two positions, a first position in which said male lug does not cooperate with any of the female notches, and a second position in which said male lug is positioned in one of the female notches;

resilient means constantly urging said lever towards its second position;

a pull connection; and means for connecting a first end of the pull connection to said lever in order to cause the lever to pass from its second position to its first position;

the castor being characterized by the fact that it further comprises:

a cavity made in said portion of the casing, said cavity including a side face of substantially cylindrical shape and an opening situated in a second face of said portion of the casing opposite from the first face from which said pivot emerges, said cavity also being made in said casing portion so that said shaft passes right through said cavity; and by the fact that:

said lever is constituted by a slide having a front face, a rear face, and a side face, the side face having a cross-section defined in a plane parallel to said first axis and perpendicular to the second axis that is substantially complementary to the cross-section of the side face of said cavity, in such a manner that the slide is suitable for sliding in translation in said cavity between its first and second positions along a direction perpendicular to said first axis, its rear face facing the inside of said cavity.

BRIEF DESCRIPTION OF THE DRAWINGS

Other characteristics and advantages of the invention appear from the following description given with reference to the accompanying drawing by way of non-limiting illustration, and in which:

FIGS. 1 and 3 show various views of an embodiment of the castor of the invention, specifically: FIG. 1 is a diagrammatic cross-section view on a vertical plane, and FIG. 2 is a perspective view from beneath the castor of FIG. 1, omitting the slide, an embodiment of which is shown in side view and in perspective in FIG. 3.

DETAILED DESCRIPTION OF THE PREFERRED EMBODIMENTS

It is specified that, in the present description, if the adverb "substantially" is associated with a qualification to any given means, then the qualification may be understood understood equally well as being approximate or exact.

The present invention relates to a castor of the lockable-and-unlockable type that locks automatically without being subjected to any particular action, but that can be unlocked only if it is subjected to a voluntary external action.

The castor of the invention comprises a casing 10 of conventional type, e.g. of a shape as shown in the figures, at least two wheels 11, 12 suitable for coming into contact with a given surface Sd, and means for mounting the two wheels rotatably relative to the casing on a shaft 14 that is connected to the casing and defined along a first axis 15 and that is substantially parallel to the surface Sd when the castor is running on that surface.

It is specified that, in the meaning of the present description, the term "shaft" 14 covers any rotary or stationary shaft, optionally arranged in a sheath, or situated beside a spacer, that generally defines the axis of rotation 15 about which the two wheels 11, 12 rotate when the castor moves over the ground Sd.

Furthermore, the wheels 11, 12 are rotatably mounted on the casing 10 in such a manner that at least a portion 10' of the casing is situated between the two wheels.

The castor also has a pivot 20 defined along a second axis 21. The pivot serves to connect the castor to the end of a bar of a piece of furniture to which the castor is to be mounted, such as a piece of hospital equipment or furniture, e.g. a trolley, a walking frame, etc., or indeed a suitcase or the like.

The pivot 28 is mounted to co-operate with the casing 10 in such a manner that the second axis 21 is both substantially orthogonal to the first axis 15, advantageously being situated at a non-zero distance from the first axis 15 and contained in a plane parallel to the two planes respectively occupied by the two wheels 11, 12, and is also situated between those two planes.

The pivot may be stationary relative to the casing 10, in which case it is constituted by a stud or the like, or it may be mounted to pivot relative to the casing, in which case the castor has means for mounting the pivot to pivot relative to the casing 10 about the second axis 21. Such means are themselves known and may advantageously essentially include ball or needle type bearing means, or the like.

The castor also includes locking-and-unlocking means 300 for acting on at least one wheel relative to the casing, and advantageously on both wheels 11, 12. In accordance with a characteristic of the invention, these locking-and-unlocking means preferably include two sets of female notches 301, 302, 303, . . . , shown more particularly in FIG. 1, which sets are made respectively in the two faces 305, 306 of the wheels 11, 12 that face towards the portion 10' of the casing 10 that is situated between the wheels. In highly preferred manner, the female notches are formed over the entire perimeters of the facing faces of the two wheels 11, 12 so as to be certain of blocking the castor, as explained below, regardless of the angular position of a wheel in its rotation relative to the casing.

The locking means also include a lever 310 mounted to co-operate with the casing 10, and at least one male lug 321, 322 secured to the lever 310 and complementary to the female notches 301, 302, 303, . . . respectively of both sets of female notches.

The lever 310 is mounted to co-operate relative to the casing 10 in such a manner as to be suitable for occupying at least two positions, a first position in which the two lugs and 321, 322 do not cooperate with any of the female notches 301, 302, 303, . . . , as shown in FIG. 1, and a second position, not shown, in which the two lugs 321, 322 are positioned respectively in both sets of female notches.

It should be understood that the use of the terms "female" and "male" to qualify the notches is merely to facilitate description, and that it is clear that male notches could be on the wheels and female notches could be on the lever, or on the slide 500 as described below, and vice versa.

In order to enable the castor to be locked automatically without being subjected to any particular action, as defined above, the locking-and-unlocking means 300 also include resilient means 330 constantly urging the lever 310 towards the second position.

In order to enable the castor to be unlocked by a deliberate external action, a pull connection 340 is provided, together with means for connecting a first end 341 of the pull connection 340 to the lever 310 in order to cause it to pass from its second position to its first position (an embodiment of these means being described below).

According to a characteristic of the invention, the castor also has a cavity 400 made in the portion 10' of the casing 10, this cavity having a side face 403 of substantially cylindrical shape and an opening 401 situated in a second face 402 of the portion 10' of the casing 10 opposite from the first face 406 from which the pivot 20 emerges, this cavity 400 also being made in this portion 10' of the casing in such a manner that the shaft 14 passes right through it.

According to another characteristic of the invention, the lever, having the primary function as defined above, is constituted by a slide 500 having a front face 501, a rear face 502, and a side face 503, see FIG. 3.

The side face 503 presents a cross-section as defined in a plane parallel to the first axis 15 and perpendicular to the second axis 21 that is substantially complementary to the cross-section of the side face 403 of the cavity 400, such that the slide is suitable for sliding in translation in the cavity 400 between its first and second positions in a direction substantially perpendicular to the first axis 15 and parallel to the second axis 21, the rear face 502 of the slide being its face that faces towards the inside 404 of the cavity 400.

According to another characteristic of the invention, and in entirely preferred manner, the castor has two tabs 601, 602 secured to the rear face 502 of the slide 500, see FIGS. 1 and 3. These two tabs are situated in two respective planes that are parallel to the first and second axes 15 and 21, and they are spaced apart from each other by a distance that is not less than the diameter of the shaft 14. Also, they are arranged on the rear face 502 of the slide in such a manner that, when the slide is between its first and second positions, see FIG. 1, and indeed when it is in these positions, the shaft 14 is situated between the two tabs.

Advantageously, according to a characteristic of the invention, at least one of the two tabs 601, 602 includes a re-entrant portion of curvature 611, 612 facing towards the other tab so that the distance between the free end of the portion of curvature and the free end of the other tab is less than the diameter of the shaft 14.

In still more advantageous manner, and as shown in FIGS. 1 and 3, each of the two tabs includes a respective re-entrant portion of curvature 611, 612 facing towards the other tab so that the distance between the free ends of these two portions of curvature is less than the diameter of the shaft 14.

With these two above-defined characteristics, and in highly advantageous manner, the castor further includes at least one spline 630, 631 made in the cavity 400.

This spline, which serves to reinforce the casing, may optionally be arranged in such a manner that, during movement of the slide 500 from its second position to its first position, at least one of the two tabs 601, 602 comes to bear in sliding against the spline, between the spline and the shaft 14, so that it is held close to the shaft 14, i.e. substantially constantly in contact with the shaft 14, but while applying pressure that is not very great, just enough to ensure that the distance between the facing free ends of the two curved portions remains less than the diameter of the shaft.

In preferred manner, in one possible embodiment that is relatively simple, the resilient means 330 for constantly urging the lever 310 towards its second position are constituted by a compression spring, e.g. a helical spring, mounted between the rear face 502 of the slide 500 and the shaft 14, as shown in FIG. 1.

Finally, depending on the structural characteristics of the castor as described above, and as can be seen in FIGS. 1 and 3, the means 350 for connecting a first end 341 of the pull connection 340 to the above-defined lever 310 comprise a plate portion 700 or the like secured to project from the slide 500 in such a manner that the plate portion faces the casing 10 and is also intersected by the second axis 21, there being a through orifice 701 made in the plate portion 700 substantially centered on the second axis 21, this through orifice having a section that is not less than the section of the pull connection 340, the first end 341 of the connection then being passed through the through orifice.

These connection means 350 also include a shoulder head 360, such as a ball abutment or the like, of cross section greater than the cross-section of the through orifice. This shoulder head 360 is secured by appropriate means, welding, crimping, adhesive, etc., to the first end 341 of the connection 340 emerging from the orifice 701, and it is also arranged at said end 341 in such a manner that it is positioned to bear against the edge of the through orifice 701 that is opposite from its edge facing the casing 10, see FIG. 1.

The component elements of the castor are made using materials of the kind commonly used for making castors of the same type in the prior art. Thus, for the sole purpose of simplifying the present description, these materials are not described more fully herein.

The castor of the invention operates as follows:

It is assumed by way of example that the castor is mounted on a bar of a walking frame that is constituted in conventional manner by an assembly of bars, tubes, etc. The castor is fastened to an end of one of the bars, via the pivot 20, with the pull connection 340 passing inside the bar (possibly, where necessary, inside a sheath like that used for a bicycle brake) so that its emerging end leads to a point beside a handle for guiding the train and that is for being gripped by its user when moving with the frame. By way of example, the emerging end of the pull connection is mounted to co-operate with a "brake handle" type handle like those to be found on bicycle handlebars.

When the frame is not in use, the spring 330 acts on the slide 500 so that it occupies its second position, as shown in FIG. 1, with the two male lugs 321, 322 being received in respective notches of the two sets of female notches 301, 302, 303, ... thereby preventing the wheels 11, 12 from running on the surface of the ground Sd. The frame is stationary relative to the ground Sd and a potential user can even lean against it relatively safely without fear of the frame moving accidentally.

In contrast, if the user desires to move with the help of the frame, then the user can perform a deliberate voluntary action on the brake handle, e.g. by squeezing it towards the guide handle, thereby having the effect of exerting traction on the pull connection 340, and thus causing the slide 500 to move in translation in the cavity 400 from its second position (not shown) to its first position (shown in FIG. 1), i.e. to cause the lugs 321, 322 to move out from the female notches so as to allow the wheels 11, 12 to run on the ground Sd.

By way of example, should the user desire to take a rest, it suffices to release the brake handle so as to enable the slide 310 to return to its second position in which the wheels 11, 12 are locked, as described above, thereby once more preventing the frame from moving over the ground Sd.

The castor may be mounted in the same manner on a leg of a trolley, on a leg of hospital equipment, on a suitcase, etc., or in association with any other type of furniture, and it then operates in the manner described above.

However, it is important to emphasise an advantage presented by the castor of the invention in comparison in particular with the castor described in the prior document referred to in the introduction of the present description.

Specifically, the structure of the castor of the invention makes it much easier to assemble than the prior art castor. This advantage results from the fact that the slide is mounted to move in translation in the cavity 400 as opposed to moving in rotation as in the prior art castor, which means there is no need to position the pivot axis of the lever, where such an operation is difficult to automate.

In order to assemble the castor of the invention, it suffices to force the slide 50 into the cavity 400 until the ends of the two tabs 301, 602 come into abutment against the shaft 14, via their portions of curvature 612, 622. As a result of their natural resilience and of their appropriate shape, these two tabs then move apart in order to go past the shaft, after which they close together around it. During this operation, the spring 360 is compressed.

Once this operation has been finished, it suffices to connect the end 341 of the pull connection 340 to the plate 700, as described above with reference to FIG. 1, and then to place the two wheels on the shaft 14, with the female notches carried by the two wheels then being automatically suitable for co-operating with the male lugs on the slide 500.

The invention claimed is:

1. A lockable castor comprising:
   a casing;
   at least two wheels configured to come into contact with a given surface;
   a mounting system configured to mount said two wheels to rotate relative to the casing on a shaft defined along a first axis that is substantially parallel to said surface, such that at least a portion of said casing is situated between said two wheels;
   a pivot defined along a second axis, said pivot being mounted to cooperate with said casing such that said second axis is both substantially orthogonal to the first axis, being contained in a first plane parallel to the two planes respectively occupied by the two wheels, and is also situated between the two planes, said pivot emerging from the casing via a first face of said casing;
a locking-and-unlocking system configured to lock and unlock the two wheels relative to the casing, said locking-and-unlocking system comprising:
at least one set of female notches made in at least one of the two faces of said wheels that face towards said portion of the casing,
a lever mounted to cooperate with said casing,
at least one male lug complementary to the female notches of said set of female notches,
a securing system configured to secure said male lug to said lever, said lever being mounted to cooperate with said casing and configured to occupy at least two positions, a first position in which said male lug does not cooperate with any of the female notches and a second position in which said male lug is positioned in one of the female notches,
a resilient device constantly urging said lever towards the second position,
a pull connection, and
a connector configured to connect a first end of the pull connection to said lever to cause the lever to pass from the second position to the first position; and
a cavity defined in said portion of said casing, said cavity including a side face of substantially cylindrical shape and an opening situated in a second face of said portion of the casing opposite from the first face from which said pivot emerges, said cavity being defined in said casing portion so that said shaft passes right through said cavity, wherein said lever is constituted by a slide having a front face, a rear face, and a side face, the side face having a cross-section defined in a plane parallel to said first axis and perpendicular to the second axis that is substantially complementary to the cross-section of the side face of said cavity such that the slide is configured to slide in translation in said cavity between first and second positions of the slide along a direction perpendicular to said first axis, the rear face of the slide being the face that faces the inside of said cavity.

2. The castor according to claim 1, further comprising two tabs secured to the rear face of the slide, the two tabs being situated in two respective planes that are parallel to the first and second axes and that are spaced apart from each other by a distance not less than the diameter of said shaft, the tabs being arranged on said rear face of the slide such that when the slide is between the first and second positions thereof, and when the slide is in said positions, said shaft is situated between the two tabs.

3. The castor according to claim 2, wherein at least one of the two tabs includes a re-entrant portion of curvature facing towards the other tab so that the distance between the free end of the portion of curvature and the free end of the other tab is less than the diameter of the shaft.

4. The castor according to claim 3, further comprising at least one spline made in said cavity, said spline being arranged in such a manner that, during the movement of the slide from a second position thereof towards a first position thereof, at least one of the two tabs comes to bear in sliding against said spline between said spline and the shaft so that the at least one tab is held substantially constantly in contact with said shaft.

5. The castor according to claim 2, wherein each of the two tabs includes a respective re-entrant portion of curvature facing towards the other tab so that the distance between the free ends of the two portions of curvature is less than the diameter of the shaft.

6. The castor according to claim 5, further comprising at least one spline made in said cavity, said spline being arranged in such a manner that, during the movement of the slide from a second position thereof towards a first position thereof, at least one of the two tabs comes to bear in sliding against said spline between said spline and the shaft so that the at least one tab is held substantially constantly in contact with said shaft.

7. The castor according to claim 2, wherein the resilient device comprises a compression spring mounted between the rear face of the slide and said shaft.

8. The castor according to claim 2, wherein the connector comprises:
a plate portion secured to project from said slide such that said plate portion faces said casing and is intersected by said second axis,
a through orifice defined in said plate portion and substantially centered on said second axis, the through orifice having a section not less than the section of said connection, the first end of said connection being passed through said through orifice, and
a shoulder head of cross-section greater than the cross-section of said through orifice and secured to the first end of said connection, said shoulder head being positioned to bear against the edge of the through orifice that is opposite from its edge facing the casing.

9. The castor according to claim 1, wherein the resilient device comprises a compression spring mounted between the rear face of the slide and said shaft.

10. The castor according to claim 1, wherein the connector comprises:
a plate portion secured to project from said slide such that said plate portion faces said casing and is intersected by said second axis,
a through orifice defined in said plate portion and substantially centered on said second axis, the through orifice having a section not less than the section of said connection, the first end of said connection being passed through said through orifice, and
a shoulder head of cross-section greater than the cross-section of said through orifice and secured to the first end of said connection, said shoulder head being positioned to bear against the edge of the through orifice that is opposite from its edge facing the casing.

* * * * *